United States Patent [19]

Thomann

[11] 3,710,465

[45] Jan. 16, 1973

[54] METHOD FOR THE SUBSEQUENT ADJUSTING OF THE TRANSIT TIME OF A PIEZO-ELECTRIC CERAMIC SUBSTRATE FOR AN ELECTRO-ACOUSTICAL DELAY LINE

[75] Inventor: Helmut Thomann, Munich, Germany

[73] Assignee: Siemens Aktiengesellschaft

[22] Filed: April 19, 1971

[21] Appl. No.: 134,984

[30] Foreign Application Priority Data

April 23, 1970 Germany....................P 20 19 780.2

[52] U.S. Cl.....................29/25.35, 29/594, 333/30 R

[51] Int. Cl...........................................B01j 17/00

[58] Field of Search...................333/30, 72; 178/5.4; 340/173.2; 330/5.5; 29/25.35, 594

[56] References Cited

UNITED STATES PATENTS

| | | | |
|---|---|---|---|
| 3,359,470 | 12/1967 | Takahashi et al. | 29/25.35 |
| 3,582,540 | 6/1971 | Adler | 178/5.4 |
| 3,496,553 | 2/1970 | Freytag et al. | 340/173.2 |
| 3,377,588 | 4/1968 | Picquendar | 343/8 |
| 3,200,354 | 8/1965 | White | 333/30 |
| 3,388,334 | 6/1968 | Adler | 330/5.5 |
| 3,614,463 | 10/1971 | Slobodnik | 307/88.3 |
| 3,564,515 | 2/1971 | Gratrian | 340/173 |

*Primary Examiner*—Herman Karl Saalbach
*Attorney*—Hill, Sherman, Meroni, Gross & Simpson

[57] ABSTRACT

A method for adjusting or varying the transit time between input and output transducers disposed on a piezo-electric substrate of a polarized ceramic by applying an electrical field in a direction opposed to the residual polarization to decrease the residual polarization or with the direction of residual polarization to increase the residual polarization to cause corresponding changes in the modulus of elasticity of the substrate and thus the speed of propagation of a surface wave between the input and output electrodes.

4 Claims, 2 Drawing Figures

INVENTOR
Helmut Thomann
BY
Hill, Sherman, Meroni, Gross & Simpson
ATTYS.

METHOD FOR THE SUBSEQUENT ADJUSTING OF THE TRANSIT TIME OF A PIEZO-ELECTRIC CERAMIC SUBSTRATE FOR AN ELECTRO-ACOUSTICAL DELAY LINE

BACKGROUND OF THE INVENTION

1. Field of the Invention

The present invention is directed to a method of adjusting the transit time for a surface wave between an input and an output transducer of a surface-wave acoustic device by the application of an electrical field to irreversibly change the residual polarization of the ceramic substrate of the device.

2. Prior Art

The acoustic device such as a delay time of a surface wave delay line is determined by the distance between the transducer system and by the speed of propagation of the surface wave in the substrate of the device. The distance between the transducers is usually unchangeable since the application of the metal electrodes of the transducer is usually accomplished by a vacuum evaporation process. To adjust the delay time by changing the distance between the input and the output transformers is therefore substantially impossible once the transducers have been provided on the substrate. One method to enable adjustments in the delay time between the input and output transducers was to develop a device in which two piezoelectric substrates were utilized each of which have a transducer deposited thereon. The two substrates were then assembled with the surfaces supporting the transducers in face-to-face relationship in such a way that a wedge shaped air gap was formed therebetween. By means of mechanically shifting of the two crystals or substrates with regard to each other, the time delay could be adjusted. Such a device required expensive mechanical manipulations in order to make the necessary adjustments in the time delay between the input and output transformers.

SUMMARY OF THE INVENTION

The present invention is directed to a method for adjusting the transit time between an input and output transducer by adjusting the modulus of elasticity in a piezo-electric substrate by irreversibly changing the residual polarization of the substrate. To decrease the residual polarization, an electric field is applied to the substrate which field has a direction opposite to the direction of the residual polarization to cause a weakening or reduction therein. To increase the residual polarization, the method involves applying an electric field in the same direction as the direction of the polarization which field is greater than the field strength of the residual polarization to cause an increase in the residual polarization.

Accordingly it is an object of the present invention to provide a method for adjusting the transit time of a surface wave between the transducers of a surface-wave acoustic device.

Another object of the present invention is to provide a method of providing adjustments in the transit time of an electro-acoustical device to compensate for misalignment in the positions of the input and output transducers on a piezo-electric substrate.

THE FIGURES

DESCRIPTION OF THE PREFERRED EMBODIMENT

Figure 1:
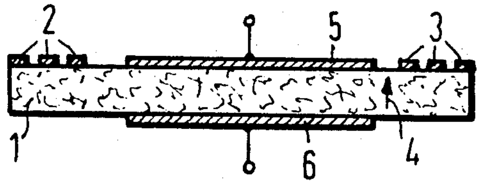
FIG. 1 shows a side view of a delay line according to the invention.

Although the principles of the present invention are particularly useful in adjusting or changing the transit time in a ceramic substrate 1 between attached transducers 2 and 3 of an electro acoustical device such as a delay line, it is also useful in equalizing the transit time of an ultrasonic wave between input and output transducers, to adjust the phase position of the output voltage to a certain value in relation to the input voltage, and to shift without mechanical change in the transducer system the resonant frequency of a delay line so that the maximum energy which is applied to the input transducer is transformed into a maximum ultrasonic energy.

The delay line has a piezo electric substrate 1 which on one surface has applied finger-like electrodes for a transducer 2 and at the other end similar fingerlike electrodes for the transducer 3. The transducers 2 and 3 are interdigital transducers with interengaging prong-like or finger-like electrodes. The electrodes of the transducers 2 and 3 are preferably applied to a surface of the piezo electric substrate 1 by a vacuum-evaporation process with appropriate masking or the entire surface is metalized and then etched to form the configuration of the transducers 2 and 3 with an appropriate photo etching process. The substrate 1 can be piezo electric materials such as a lead-zirconate-titanate (PZT) ceramic, and is usually polarized in a direction perpendicular to the surface on which the transducers are placed as indicated by the arrow 4. As illustrated, the substrate 1 is provided with electrodes 5 and 6 which are disposed on opposite surfaces of the substrate between the transducers 2 and 3. Each of the electrodes 5 and 6, which can be formed on the substrate when the transducers are formed, are provided with appropriate electrical leads which are connected in an appropriate circuit during the performance of the method of the adjusting.

In operation of the delay line, the input transducer 2 converts an electro magnetic signal into acoustical surface waves which are propagated along the surface of the substrate 1. When the surface wave reaches the output transducer 3, the waves are converted back to an electro magnetic signal. If the spacing between transducers 2 and 3 is incorrect for the particular surface wave, transmission losses will occur in the device due to coupling losses. Incorrect spacing can be due to incorrect spacing between the transducers when applied to the substrate.

To correct for misplacement of the transducers 2 and 3, a change in the modulus of elasticity of the substrate 1 will change the speed of propagation of the elastic waves and the surface waves which are directly proportional to the frequency constant. By changing the polarization of the substrate by the application of electrical field will change the frequency constant and thus change the speed of propagation of the surface wave so that they reach the output transducers such as 3 in the right phase or sequence.

Figure 2:
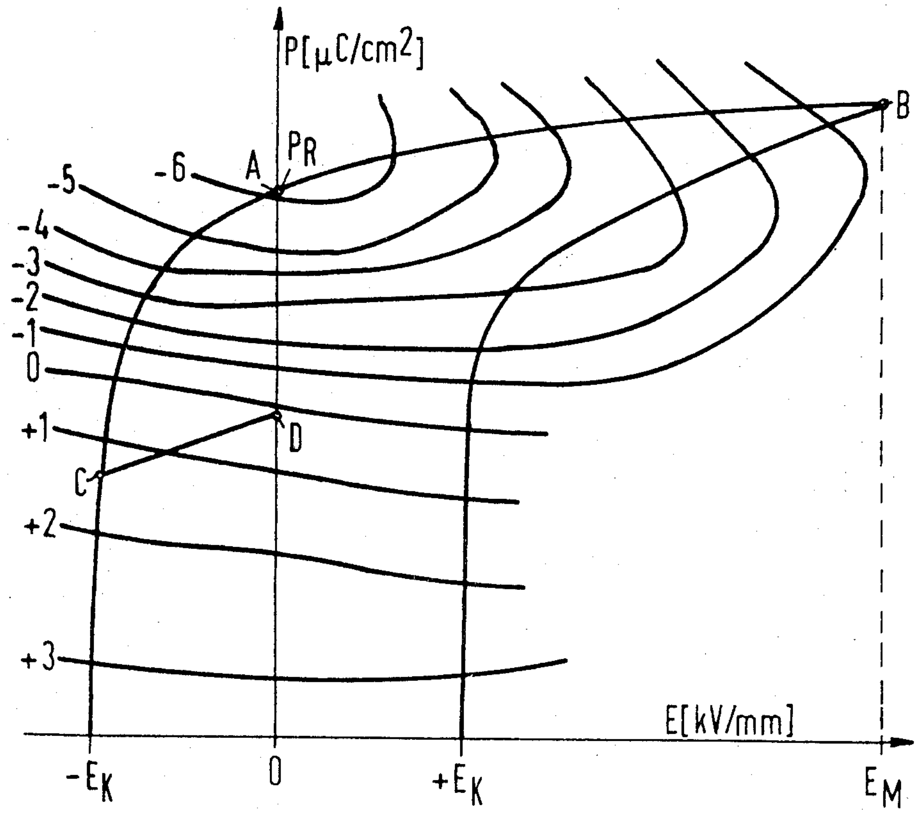
FIG. 2 shows a graph pertinent to the method of varying the delay.

Referring to FIG. 2, a portion of a hysteresis loop is illustrated for a certain piezo-electric ceramic substrate which loop occurs with a particular polarization of the ceramic substrate. The contour lines provide an outline of the frequency constant with respect to the polarization of the substrate. The residual or remanent polarization $P_R$ at a zero field strength is identified as point A. To reversably change the field strength, an application of an electrical field through the electrodes 5 and 6 with the direction of the field being in the same direction as the residual polarization, will cause movement on the hysteresis loop from point A to B with the amount of movement dependent on the time of application and strength of the field. With the removal of the field, the induced polarization returns to the value of the residual polarization represented by point A. Point B is the point on the hysteresis curve at which the increased field strength will cause branching of the curve and result in the shifting to a larger hysteresis curve which will be outside of the curve illustrated in FIG. 2.

To irreversibly change the residual or remanent polarization, the field strength applied must cause a movement on the hysteresis curve past point B to shift to another loop with an increase in the residual polarization $P_R$ or the field applied should be opposite to the polarization to cause movement on the hysteresis loop past the knee to shift to a hysteresis loop which is smaller than the one illustrated.

Since a smaller electrical field is necessary to weaken or reduce the residual polarization, preferably the piezo-electric ceramic has been polarized to a maximum remanent or residual polarization. Assuming that the hysteresis curve illustrated in FIG. 2 is for a maximum residual polarization $P_R$, a reduction therein can be accomplished by applying an electrical field opposed to the residual polarization to cause movement from point A to a point C which is past the knee of the loop. Thus when the field, which would be approximately the same or slightly stronger, as the coercive force $E_K$, necessary to move the polarization to point C is removed, the polarization will follow a line from C to point D which is proportional to the relative dielectric constant of the ceramic material and is a part of a new hysteresis loop which has a smaller residual polarization and is smaller than the loop for the maximum polarization.

Assuming that the illustrated hysteresis loop is for a residual polarization $P_R$, which is less than the maximum residual polarization, the application of an electric field greater than the field strength $E_M$ applied in the direction of the residual polarization will cause movement along the portion of curve A to B and eventually pass point B to cause a shift to a larger hysteresis curve to produce an increase in the residual polarization. However since the point B is approximately at a saturation point, the amount of increase is substantially small unless the hysteresis curve illustrated is for a very minor amount of the possible maximum residual polarization.

As one can realize, from the illustration in FIG. 2, the amount of electric field needed to reduce the residual polarization such as to point D is substantially less than the amount to raise the polarization strength above point A. Therefore, preferably each of the ceramic substrates is polarized to a maximum residual polarization, and then any adjustments necessary for obtaining the resonant frequency or phase position of the acoustical wave between transformers 2 and 3 is accomplished by applying an electric field in a direction opposite to the direction of the residual polarization $P_R$ to weaken it as described hereinabove to change the speed of propagation of the surface waves and elastic waves to allow the necessary matching or adjusting in transit time.

When applying an electric field through the electrode 5 and 6 to irreversibly change the residual polarization of the ceramic substrate, the time of application of the electric field is dependent on the particular type of material of the substrate. Thus, the time for weakening or reducing the residual polarization from the value at point A to the value at point D may require several seconds or minutes depending on the material of the substrate.

Although minor modifications might be suggested by those versed in the art, it should be understood that I wish to employ within the scope of the patent warranted hereon all such modifications as reasonably and properly come within the scope of my contribution to the art.

I claim as my invention:

1. A method for subsequently adjusting the time of transit of a surface wave along a polarized piezo-electric ceramic substrate between the input transducer and the output transducer disposed on the surface of the substrate of a surface-wave acoustic device such as a delay line by changing the elastic constants of the wave-propagating surface, said method comprising the steps of providing the substrate with electrodes which are disposed on opposite surfaces of the substrate between the input and output transducers, coupling a DC-voltage across said electrodes, maintaining an electrical field produced by said DC-voltage for a period of time depending on a desired irreversible change of the remanent polarization of the ceramic substrate, and then decoupling said DC-voltage.

2. A method according to claim 1, wherein the step of irreversibly changing the remanent polarization includes applying an electrical DC-field which is stronger than the coercive field strength in a direction opposite to the direction of the remanent polarization of the substrate, and maintaining the electric field for a period of time depending on a desired weakening of the remanent polarization of the substrate.

3. A method according to claim 1, wherein the step of irreversibly changing the remanent polarization includes applying an electric DC-field in the same direction as the direction of the remanent polarization of the substrate which is stronger than the field strength, at which the hysteresis curve is branching out, and maintaining the field for a period of time depending on the desired increase in the remanent polarization.

4. A method according to claim 1, wherein said electrodes are sequentially removed.

* * * * *